3,505,219
DRILLING FLUID
Jack H. Kolaian, Houston, Tex., assignor to Texaco Inc.,
New York, N.Y., a corporation of Delaware
No Drawing. Filed Apr. 25, 1967, Ser. No. 633,381
Int. Cl. C10m 3/18, 3/04
U.S. Cl. 252—8.5                                    10 Claims

ABSTRACT OF THE DISCLOSURE

An aqueous drilling fluid dispersant and a method of drilling wells using said drilling fluid which contains a substituted cycloalkane drilling fluid dispersant, namely 1,2,3,4,5,6 - hexahydroxycyclohexane, 1,3,4,5 - tetrahydroxycyclohexanecarboxylic acid or 1,2,3,4-cyclopentanetetracarboxylic acid.

---

This invention relates to a novel aqueous drilling fluid for drilling wells through sub-surface formations by means of well drilling tools, and particularly to such an aqueous well drilling fluid having improved dispersibility as a result of containing therein a novel dispersant as hereinafter more fully described. The invention is also concerned with a method of drilling wells employing the novel aqueous drilling fluid.

Drilling fluids, or muds as they are sometimes called, are slurries of clayey solids used in the drilling of wells for tapping underground collections of oil, gas, brine or water. Such fluids have a number of different functions, the most important of which are to assist in the removal of cuttings from the well, to seal off formations of gas, oil or water which may be encountered at different levels, to lubricate the drilling tool and drill pipe which carries the tool, and to hold the cuttings in suspension in event of shut-downs in drilling.

An ideal drilling fluid is a thixotropic colloidal system, i.e., a fluid which on agitation or circulation (as by pumping or otherwise), has a measurable relatively low viscosity and is free flowing (not plastic), particularly at high temperatures; but when such agitation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above.

In accordance with the present invention the problems of dispersibility in aqueous drilling fluids can be solved by incorporating in an aqueous drilling fluid as the dispersant a substituted cycloalkane selected from the group consisting of 1,2,3,4,5,6-hexahydroxycyclohexane, 1,3,4,5-tetrahydroxycyclohexanecarboxylic acid and 1,2,3,4-cyclopentanetetracarboxylic acid.

It is known from the article appearing in Zhur. Priklad. Khem. 35, pages 638–647 (1962), "Organic Viscosity Reducers in Clay Solutions" by D. Tischenko and S. Fleisher (CA, 57, 2491g, 1962), that the ortho-dihydroxybenzenesulfonic acids, the ortho-dihydroxy-alpha-toluenesulfonic acids and water soluble salts thereof are viscosity reducing agents in clay laden drilling fluids whereas the corresponding meta- and para-dihydroxybenzenes including the corresponding sulfonic acid derivatives and water soluble salts thereof are ineffective viscosity reducing agents for aqueous drilling fluids.

The term "substituted cycloalkane" as used in the specification and claims is intended to cover the following cycloalkanes: 1,2,3,4,5,6 - hexahydroxycyclohexane, 1,3,4,5 - tetrahydroxycyclohexane-carboxylic acid and 1,2,3,4-cyclopentanetetracarboxylic acid.

The substituted cycloalkanes of the present invention may be added to an aqueous drilling fluid in amounts ranging from about 0.1 pound to about 10 pounds per barrel of drilling fluid. In general, it has been found that amounts less than 0.1 pound per barrel do not produce completely satisfactory results in terms of dispersing activity whereas amounts above about 10 pounds per barrel are economically unattractive and no improved results are obtained therewith. A preferred range for the substituted cycloalkanes of the present invention is from about 0.25 to about 7 pounds per barrel of drilling fluid for most consistent results and efficiency.

In the tables, gel strength (Gels) is reported as determined by a shearometer in accordance with the procedure in the American Petroleum Institute publication RP–29, results being expressed either as pounds/100 square feet or as time in seconds for a tube to settle in the mud (after the mud has stood for zero time and for 10 minutes). If it settles in more than 60 seconds, shear is reported as pounds per hundred square feet. Yield Point (YP) is calculated by subtracting the Plastic Viscosity (PV) from the Fann Viscosity reading at 300 r.p.m. Plastic Viscosity (PV) is obtained by calculation, subtracting the Fann reading at 300 r.p.m. from the 600 r.p.m. reading. Apparent Viscosity (AV) is equal to one half of the Fann Viscosity reading obtained at 600 r.p.m. The fluidity of a mud can be back calculated from these data, the results being expressed in Fann Viscosity at 600 r.p.m. and 300 r.p.m. for a direct reading viscosimeter.

The properties of the base muds are sown in the table.

The test data set forth in the following table indicate the surprising advantages of the subsituted cycloalkanes of the present invention and demonstrate the beneficial results of same in improving the dispersibility of drilling fluids.

Representative physical proprties of drilling fluids both before and after addition of the substituted cycloalkanes of the present invention are shown in the table. In each example the amount of material or materials added to the base mud, if any, is shown, expressed in terms of pounds of material per barrel of drilling fluid.

TABLE

| Ex. | Additional Additive, lbs. | Type Mud | Amount and Type Dispersant | PV | YP | Ap. Vis., cpe. | Shearometer Gels, lb./100 ft.² 0¹ | Shearometer Gels, lb./100 ft.² 10¹ | pH | Pm, cc. | API W.L., cc. | PF, cc. | Ca, p.p.m. | Time, hours |
|---|---|---|---|---|---|---|---|---|---|---|---|---|---|---|
| (1) | | LpH ª | 1.0 A* | 24 | 9 | 28.5 | 0¹ | 3.8 | 11.0 | | 16.2 | | | 16 |
|     | |       | 2.0   | 19 | 7 | 22.5 | 0¹ | 0²⁰ | 9.6 | | 16.0 | | | 16 |
|     | |       | 7.0   | 19 | 5 | 21.5 | 0¹ | 0⁵ | 11.1 | | 13.2 | | | 16 |
| (2) | | LpH | 0.5 B† | 9 | 10 | 14 | | | 9.4 | | | | | 0.25 |
|     | |     |        | 14 | 11 | 19.5 | 0³ | 4.8 | 9.5 | | 15.6 | | | 2 |
|     | |     |        | 20 | 10 | 25 | | | 9.4 | | | | | 16 |
| (2a)| | | 2.0 B | 8 | 4 | 10 | | | 9.3 | | | | | 0.25 |
|     | | |       | 11 | 9 | 15.5 | 0² | 3.7 | 9.8 | | 15.4 | | | 2 |
|     | | |       | 16 | 7 | 19.5 | | | 9.6 | | | | | 16 |
| (3) | | LpH | 0.5 C‡ | 14 | 7 | 17.5 | 0¹ | 0¹⁷ | 9.3 | | 14.4 | | | 16 |
|     | |     | 2.0    | 14 | 4 | 16 | 0¹ | 0¹¹ | 9.4 | | 14.0 | | | 16 |
| (4) | 2.5 lime | MOD SC ᵇ | 2.5 C | 10 | 4 | 8 | 0¹ | 0¹ | 11.7 | 5.1 | 47.6 | 0.9 | 456 | 16 |

ª LpH—Low pH mud. ᵇ MOD SC—Modified shale control mud.
* A—1,2,3,4,5,6-hexahydroxycyclohexane.
† B—1,3,4,5-tetrahydroxycyclohexanecarboxylic acid.
‡ C—1,2,3,4-cyclopentanetetracarboxylic acid.

The table above shows that the substituted cycloalkanes of the present invention are effective dispersants in low pH and modified shale control drilling fluids at concentrations of from 0.5 to 7.0 pounds per barrel.

A modified shale control drilling fluid contains lime and caustic but is free from an added water soluble calcium salt. A modified shale control drilling fluid containing lime, caustic, if needed, and the novel dispersants of the present invention will provide the same beneficial results as achieved with the shale control drilling fluid of Weiss and Hall, U.S. 2,802,783, i.e. stabilizing and hardening the shale formations in contact therewith. This surprising result is accomplished in the absence of the added water soluble calcium salt required by the Weiss and Hall patent to attain the necessary shale control chemistry need to stabilize and harden the shale formations in contact therewith.

I claim:

1. An aqueous drilling fluid containing clayey solids and as the dispersant at least about 0.1 pound per barrel of drilling fluid of a substituted cycloalkane selected from the group consisting of 1,2,3,4,5,6-hexahydroxycyclohexane, 1,3,4,5 - tetrahydroxycyclohexanecarboxylic acid and 1,2,3,4-cyclopentanetetracarboxylic acid.

2. An aqueous drilling fluid as claimed in claim 1 wherein the substituted cycloalkane is 1,2,3,4,5,6-hexahydroxycyclohexane.

3. An aqueous drilling fluid as claimed in claim 1 wherein the substituted cycloalkane is 1,3,4,5 - tetrahydroxycyclohexanecarboxylic acid.

4. An aqueous drilling fluid as claimed in claim 1 wherein the substituted cycloalkane is 1,2,3,4-cyclopentanetetracarboxylic acid.

5. An aqueous drilling fluid as claimed in claim 1 wherein the substituted cycloalkane is present in the drilling fluid in an amount of from about 0.1 to about 10 pounds per barrel of drilling fluid.

6. An aqueous drilling fluid as claimed in claim 1 wherein the substituted cycloalkane is present in the drilling fluid in an amount of from about 0.25 to about 7 pounds per barrel of drilling fluid.

7. In a method of drilling wells wherein a drilling fluid is passed through the well in contact with earth formations during the drilling operation, the improvement which comprises contacting said earth formations with an aqueous drilling fluid containing clayey solids and as the dispersant at least 0.1 pound per barrel of drilling fluid of a substituted cycloalkane selected from the group consisting of 1,2,3,4,5,6 - hexahydroxycyclohexane, 1,3,4,5-tetrahydroxycyclohexanecarboxylic acid and 1,2,3,4-cyclopentanetetracarboxylic acid.

8. A method as claimed in claim 7 wherein the substituted cycloalkane is 1,2,3,4,5,6-hexahydroxycyclohexane.

9. A method as claimed in claim 7 wherein the substituted cycloalkane is 1,3,4,5 - tetrahydroxycyclohexanecarboxylic acid.

10. A method as claimed in claim 7 wherein the substituted cycloalkane is 1,2,3,4 - cyclopentanetetracarboxylic acid.

References Cited

UNITED STATES PATENTS

| | | | |
|---|---|---|---|
| 1,819,646 | 8/1931 | Loomis et al. | 252—8.5 X |
| 2,112,553 | 3/1938 | Bartow et al. | 260—631 |
| 2,393,273 | 1/1946 | Wayne | 252—8.5 |
| 2,545,169 | 3/1951 | Salathiel | 252—8.5 |

HERBERT B. GUYNN, Primary Examiner

U.S. Cl. X.R.

252—351, 356